US005886433A

United States Patent [19]
Oda et al.

[11] Patent Number: 5,886,433
[45] Date of Patent: Mar. 23, 1999

[54] DYNAMOELECTRIC MACHINE

[75] Inventors: Keiji Oda; Hiroshi Hamano; Suetaro Shibukawa, all of Hitachinaka; Osamu Koizumi, Ibaraki-machi; Kiyoshi Hirano, Hitachinaka, all of Japan

[73] Assignees: Hitachi, Ltd., Tokyo; Hitachi Car Engineering Co., Ltd., Hitachinaka, both of Japan

[21] Appl. No.: 709,737

[22] Filed: Sep. 9, 1996

[30] Foreign Application Priority Data

Sep. 13, 1995 [JP] Japan ................................. 7-235266

[51] Int. Cl.[6] ............................................... H02K 9/20
[52] U.S. Cl. ................................................. 310/59; 310/58
[58] Field of Search ............................ 310/54, 58, 59, 310/52, 64, 65

[56] References Cited

U.S. PATENT DOCUMENTS

| 3,681,628 | 8/1972 | Kratschew | 310/54 |
|---|---|---|---|
| 3,801,843 | 4/1974 | Corman et al. | 310/52 |
| 3,955,272 | 5/1976 | Hallerback | 29/596 |
| 4,691,131 | 9/1987 | Nakano | 310/54 |
| 4,745,314 | 5/1988 | Nakano | 310/57 |
| 4,753,284 | 6/1988 | Krause et al. | 165/11.1 |
| 4,864,172 | 9/1989 | Dodt | 310/59 |
| 4,874,972 | 10/1989 | Bansal et al. | 310/57 |
| 5,488,118 | 1/1996 | Nakamura et al. | 310/54 |
| 5,490,319 | 2/1996 | Nakamura et al. | 29/596 |

Primary Examiner—Nestor Ramirez
Assistant Examiner—Michael J. Wallace, Jr.
Attorney, Agent, or Firm—Antonelli, Terry, Stout & Kraus, LLP

[57] ABSTRACT

A dynamoelectric machine is provided with an arrangement in the form of a plurality of cooling tubes disposed in or adjacent the stator core of the machine and through which a coolant is caused to flow. The coolant tubes extend axially with respect to the rotor of the machine and are spaced around the circumference of the stator. In order to regulate the cooling efficiency and reduce the coolant pressure loss in the coolant tubes, a branching arrangement in combination with a valve arrangement is disposed in at least one of the end brackets of the machine to control the flow of coolant in parallel selectively through different combinations of cooling tubes. The branching arrangement includes a plurality of circumferentially disposed chambers which communicate with respective groups of cooling tubes in parallel, and the valve arrangement allows connection of these chambers selectively in different combinations to a coolant supply and a coolant exhaust. Thereby, the coolant tubes can be connected to form different combinations of parallel passages for carrying coolant to cool the stator of the machine.

11 Claims, 7 Drawing Sheets

FIG. 10

○ : OPEN (COMMUNICATING STATE)
⊗ : CLOSE (INTERRUPTING STATE)

| COMBINA-TION No. | COOLANT FLOW PASSAGE ORDER | VALVE OPEN AND CLOSE STATE | |
|---|---|---|---|
| | | VALVE INLET 70a | VALVE OUTLET 70b |
| 1 | 70a—(1)—[13(a)—(3)—13(c); 13(b)—(4)—13(d)]—(2)—70b | (81) (⊗82b); (⊗82a) | (⊗94) (92b); (93) (92a) |
| 2 | 70a—(1)—[2a; 2b]—[13(a)—(3)—13(c); 13(b)—(4)—13(d)]—70b | (81) (82b); (82a) | (⊗94) (⊗92b); (93) (⊗92a) |
| 3 | 70a—(2a)—[13(c)—(3)—13(a); 13(d)—(4)—13(b)]—(1)—(2b)—70b | (⊗81) (⊗82b); (82a) | (⊗94) (92b); (⊗93) (⊗92a) |

DYNAMOELECTRIC MACHINE

BACKGROUND OF THE INVENTION

The present invention relates to a cooling arrangement for a dynamoelectric machine; and, more specifically, the invention relates to a dynamoelectric machine with a cooling arrangement of the externally supplied liquid cooling type in which coolant is circulated in coolant passages associated with the heat generating portions of the machine.

JP-A-7-79544 (1995) discloses conventional externally supplied liquid cooling type dynamoelectric machine which was designed to provide an enhanced cooling effect. In this machine, coolant is caused to flow through coolant passages formed by a plurality of cooling tubes within a stator core, the cooling tubes being connected to form the coolant passages through which the stator core is directly cooled by the coolant.

However, machine have the following inherent problems. Namely, since the plurality of cooling tubes are connected using connecting tubes to constitute a single long coolant passage and the coolant has to flow through the long and narrow coolant passage with the help of a pump, a large pressure loss is caused in the coolant passage, the reduction of which is difficult.

Further, since the heat recovered from the coolant is generally used for a heater, for example, in a motor vehicle, it is desirable to limit the coolant temperature variation at the coolant outlet regardless of the magnitude of the generated heat from the dynamoelectric machine. However, in the conventional machine, no specific measures were taken which limit such coolant temperature variation at the coolant outlet, so that it was necessary to vary the coolant temperature at the inlet thereof depending upon the conditions, in order to maintain the coolant outlet temperature substantially constant regardless of the magnitude of generated heat from the dynamoelectric machine.

Still further, since cooling tubes made of electrically conductive material pass through the stationary core of the dynamoelectric machine, magnetic fluxes caused by the current flowing through the stationary windings of the stator core induce electromotive forces in the cooling tubes, and, as a result, electric circuits are formed between the stationary core and the cooling tubes which tend to deteriorate the output characteristic and efficiency of the dynamoelectric machine.

SUMMARY OF THE INVENTION

An object of the present invention is to provide a dynamoelectric machine which makes it possible to reduce pressure loss in the coolant passages thereof.

Another object of the present invention is to provide a dynamoelectric machine which makes it possible to easily adjust the cooling capacity thereof, depending on the conditions, without varying the coolant temperature at the inlet and while maintaining the coolant temperature at the outlet substantially constant.

Still another object of the present invention is to provide a dynamoelectric machine which makes it possible to prevent magnetic fluxes caused by current flowing through the stationary windings of the stator from inducing electromotive forces in the cooling tubes.

The first mentioned object is achieved by a dynamoelectric machine according to the present invention which comprises a rotor supported rotatably, a stator disposed around the outer circumference of the rotor and including stationary windings which are designed to generate rotating magnetic fields and a stationary iron core and, a plurality of coolant passages formed in the axial direction of the stationary iron core, characterized in that the above dynamoelectric machine further comprises two coolant branching means, each connected to one end of at least two of the plurality of coolant passages, the two coolant branching means including a supply coolant branching means of which an upstream side is connected to a coolant supply source and an exhaust coolant branching means of which a downstream side is connected to an exhaust coolant receiving arrangement, and the plurality of coolant passages are constituted by at least two upstream side coolant passages connected to each other in parallel to the supply coolant branching means, at least two downstream side coolant passages connected each other in parallel to the exhaust coolant branching means and intermediate coolant passages connecting the at least two upstream side coolant passages and the at least two downstream side coolant passages.

Preferably, the dynamoelectric machine is characterized in that the upstream side coolant passages, the downstream side coolant passages and the intermediate coolant passages are respectively provided so as to pass through the stationary iron core in the axial direction thereof.

The first and second mentioned objects are achieved by a dynamoelectric machine, according to the present invention, which is characterized in that the coolant branching means further includes supply and exhaust coolant branching means of which an upstream side is connected to the coolant supply source and of which a downstream side is connected to the exhaust coolant receiving arrangement, and all of the coolant branching means, including the supply and exhaust coolant branching means, are constituted to be freely connectable to each other at the upstream side and the downstream side thereof, as well as being constituted to permit selective change-over between parallel and series connections via change-over connection means.

Further, the dynamoelectric machine also includes two end brackets which rotatably support both ends of a rotatable shaft provided for the rotor via bearings, and is characterized in that the supply coolant branching means is a supply coolant reservoir formed within one of the two end brackets.

Further, the dynamoelectric machine, which includes the two end brackets which rotatably support both ends of a rotatable shaft provided for the rotor via bearings, is characterized in that the exhaust coolant branching means is an exhaust coolant reservoir formed within one of the two end brackets.

Further, the dynamoelectric machine, which includes the two end brackets which rotatably support both ends of a rotatable shaft provided for the rotor via bearings, is characterized in that the supply and exhaust coolant branching means is provided as a supply and exhaust coolant reservoir formed within one of the two end brackets. Further, the dynamoelectric machine is characterized in that the above mentioned change-over connection means includes a first open and close valve which controls opening and closing of a conduit connecting the upstream side of the supply coolant branching means and the coolant supply source, a second open and close valve which controls opening and closing of a conduit connecting the upstream side of the supply and exhaust coolant branching means and the coolant supply source, a third open and close valve which controls opening and closing of a conduit connecting the downstream side of the supply and exhaust coolant branching means and the exhaust coolant receiving arrangement, and a fourth open and close valve which controls opening and closing of a conduit connecting the downstream of the exhaust coolant branching means and the exhaust coolant receiving arrangement.

The third mentioned object is achieved by a dynamoelectric machine, according to the present invention, which comprises a rotor supported rotatably, a stator disposed around the outer circumference of the rotor and including stationary windings which are designed to generate rotating magnetic fields and a stationary iron core and a plurality of coolant passages formed in the axial direction of the stationary iron core, characterized in that the coolant passages are constituted by fixing cooling tubes made of high thermal conductivity material into apertures formed through the stator iron core in the axial direction thereof, and the cooling tubes are provided with insulating means which isolates them from the stator iron core. Preferably, the dynamoelectric machine is characterized in that the insulating means is at least one of an insulation coating and insulation covering formed on the outer circumferences of the U cooling tubes.

Further, the dynamoelectric machine is characterized in that the insulating means is formed by an insulating material constituting the cooling tubes.

Further, the dynamoelectric machine is characterized in that the insulating means is implemented by forming the cooling tubes with a material having an electric resistivity of more than 10 $\mu\Omega$· cm.

Further, the dynamoelectric machine is characterized in that the stator iron core is provided with interlinking magnetic flux reducing means which reduces magnetic flux components interlinking with the cooling tubes among the magnetic fluxes induced when current flows through the stator windings.

Further, the dynamoelectric machine is characterized in that the interlinking magnetic flux reducing means is provided as a clearance portion formed in the stator iron core at the outer circumferential region with respect to the cooling tubes.

Further, the dynamoelectric machine is characterized in that the interlinking magnetic flux reducing means is a non-metallic layer formed in the stator iron core at the outer circumferential region with respect to the cooling tubes.

The third mentioned object is achieved by a dynamoelectric machine, according to the present invention, which comprises a rotor supported rotatably, a stator disposed around the outer circumference of the rotor and including stationary windings which are designed to generate rotating magnetic fields, and a stationary iron core and a plurality of coolant passages formed in the axial direction of the stationary iron core, characterized in that the coolant passages are provided with coolant leakage preventing means over the inner circumferences of apertures formed through the stator iron core in the axial direction thereof.

Preferably, the dynamoelectric machine is characterized in that the coolant passages are disposed within the stator iron core at the outer circumferential side with respect to the stator windings.

In the present invention thus constituted, the coolant from the coolant supply source is supplied to at least two upstream side coolant passages in parallel via the supply coolant branching means, of which an upstream side is connected to the coolant supply source, for example, via the supply coolant reservoir within the end bracket. Further, the coolant thus supplied in parallel is introduced into at least two downstream side coolant passages via intermediate coolant passages. Thereafter, the coolant streams at least from two parallel lines are introduced into the exhaust coolant branching means, to which these downstream side coolant passages are connected in parallel, for example, and are merged into the exhaust coolant reservoir formed within the end bracket, from which the coolant is then exhausted to the exhaust coolant receiving 4 arrangement.

As will be understood from the above, when the coolant flows through a plurality of the coolant passages, the coolant flows at least partly in a parallel flow branching in at least two parallel lines. Therefore, the pressure loss in the coolant passages can be reduced in comparison with a conventional cooling system wherein coolant flows as a single flow through a long coolant passage formed by connecting all of a plurality of cooling tubes in series.

Further, as opposed to the cooling arrangement wherein coolant flows through the stator iron core to cool the same from the inner side thereof, the arrangement according to the present invention can be applied to another type of cooling arrangement wherein coolant flows in a frame for the stator iron core disposed around the outer circumference of the stator iron core to thereby cool the stator iron core from the outer circumferential side thereof via the frame. Further, change-over between a series connection and a parallel connection of the supply and exhaust coolant branching means, the supply coolant branching means and the exhaust coolant branching means, all of which are freely connectable to each other at their upstream and downstream sides, is performed with the change-over connection means.

Namely, in one example, by opening the first open and close valve, the conduit connecting the supply coolant reservoir within the end bracket communicates with the coolant supply source; by closing the second open and close valve, the conduit connecting between the upstream side of the supply and exhaust coolant reservoir and the coolant supply source is interrupted; by opening the third open and close valve, the conduit connecting the downstream side of the supply and exhaust coolant reservoir communicates with the exhaust coolant receiving arrangement; and by closing the fourth open and close valve, the conduit connecting the downstream side of the exhaust coolant reservoir and the exhaust coolant receiving arrangement is interrupted; thereby, the coolant from the coolant supply source can flow through a route from the first open and close valve→the supply coolant reservoir→the exhaust coolant reservoir supply and exhaust coolant reservoir→the third open and close valve→the exhaust coolant receiving arrangement.

Further, in another example, by opening the first open and close valve, the conduit connecting the supply coolant reservoir within the end bracket communicates with the coolant supply source; by similarly opening the second open and close valve, the conduit connecting the upstream side of the supply and exhaust coolant reservoir communicates with the coolant supply source; by closing the third open and close valve, the conduit connecting the downstream side of the supply and exhaust coolant reservoir and the exhaust coolant receiving arrangement is interrupted; and by opening the fourth open and close valve, the conduit connecting the downstream side of the exhaust coolant reservoir communicates with the exhaust coolant receiving arrangement; thereby, the coolant from the coolant supply source can flow through two parallel routes from the first open and close valve→the supply coolant reservoir and from the second open and close valve→the supply and exhaust coolant A reservoir and then can flow through the exhaust coolant reservoir→the fourth open and close valve→the exhaust coolant receiving arrangement.

Through changing-over the order and manner of the connection depending on the circumferences, as explained above, the coolant distributing directions and the number of parallel circuits of the coolant passages can be varied, so that the cooling capacity of the cooling arrangement can be easily adjusted. Accordingly, with the cooling arrangement of the present invention, a variety of requirements relevant to coolant waste heat reusing, such as keeping the outlet temperature substantially constant regardless of the magnitude of the generated heat at the dynamoelectric machine, can be satisfied.

Further, in accordance with the present invention, the coolant passages are constituted by securing the cooling tubes of high thermal conductivity material into the apertures formed through the stator iron core in the axial direction thereof, so that the heat generated from the stator windings is efficiently cooled with the coolant. Further, with the provision of an insulating means for the cooling tubes which isolates the same from the stator iron core, for example, by forming the cooling tubes with an insulator material, or with a material having an electrical resistivity of more than $10 \mu\Omega \cdot$ cm, or by applying an insulation coating or insulation covering over the outer circumference of the cooling tubes, possible electrical circuits formed between the stator iron core and the cooling tubes are interrupted, so that electromotive forces induced in the cooling tubes by the magnetic fluxes caused by the currents flowing through the stator windings are prevented.

Further, with the provision in the stator iron core of the interlinking magnetic flux reducing means for reducing a magnetic flux component which inter-links with the cooling tubes, among the magnetic fluxes caused when current flows through the stator windings, the magnetic fluxes which interlink with the cooling tubes are reduced, so that the electromotive forces induced in the cooling tubes by the magnetic fluxes caused by the current flowing through the stator windings are further reliably prevented.

Still further, in accordance with the present invention, when the coolant passages are constituted by use of coolant leakage preventing means provided over the inner circumferences of apertures formed through the stator iron core in the axial direction thereof, thereby avoiding the need for separate cooling tubes, the formation of electric circuits between the stator iron core and the cooling tubes, which is possible when using the cooling tubes, is eliminated, so that the induction of the electromotive forces is definitely prevented.

BRIEF DESCRIPTION OF THE DRAWINGS

FIG. 10 is a diagram showing combinations of coolant flow passages according to the first embodiment;

DETAILED DESCRIPTION OF THE PREFERRED EMBODIMENTS

Hereinbelow, various embodiments of the present invention will be explained with reference to the drawings.

A first embodiment of the present invention will be explained with reference to FIGS. 1 through 10.

Figure 1:
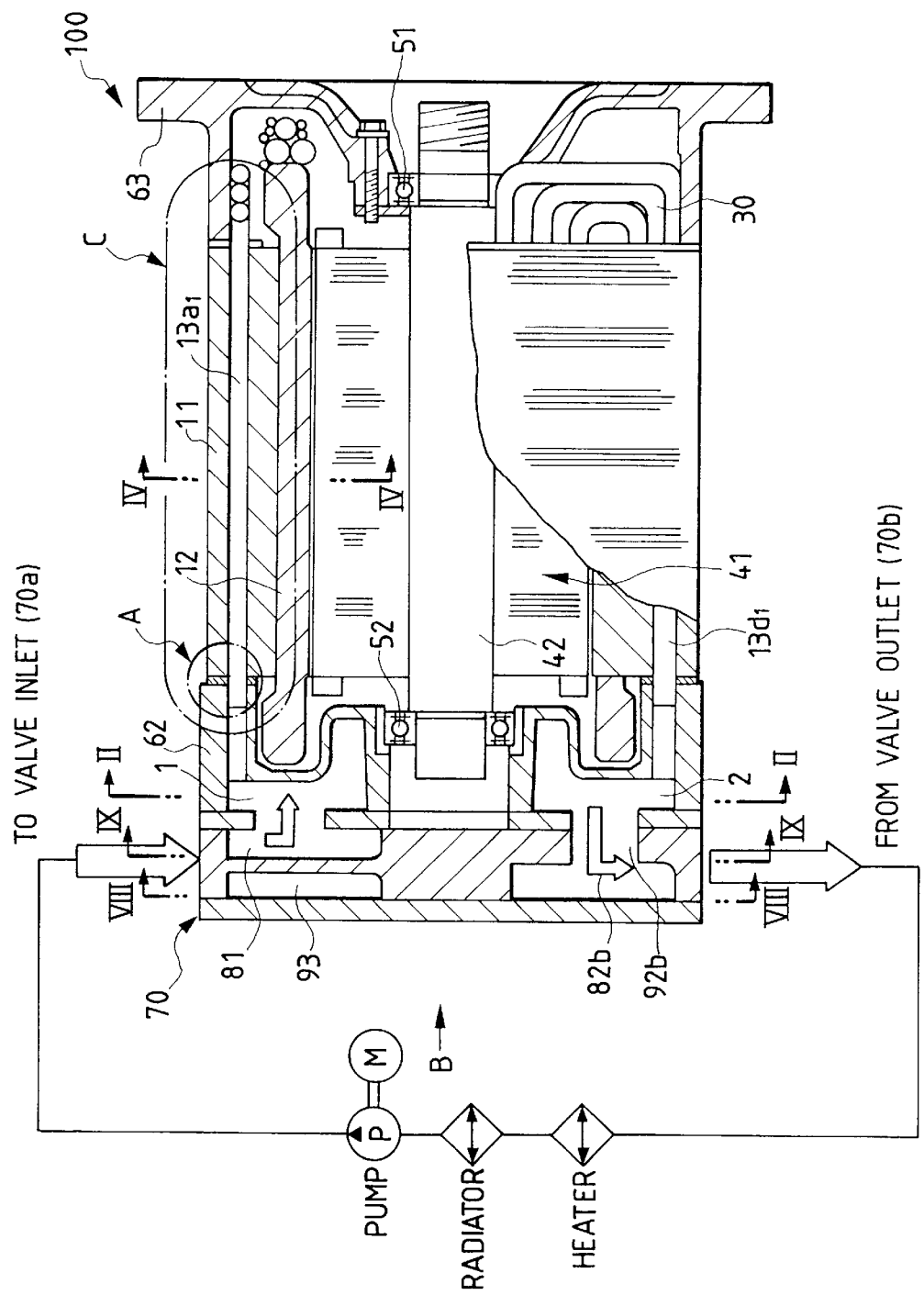
FIG. 1 is a longitudinal cross sectional view showing the structure of a dynamoelectric machine representing a first embodiment according to the present invention.

FIG. 1 shows a cross sectional view of a dynamoelectric machine representing the present invention. In FIG. 1, a dynamoelectric machine 100 includes a stator iron core 11, a stator winding 12 wound over the stator iron core 11, end brackets 62 and 63 disposed so as to sandwich the stator iron core 11 from both axial direction sides thereof, and a rotor shaft 42 of a rotor 41 which is rotatably supported by the end brackets 62 and 63 via bearings 51 and 52. At the outer circumferential region in the stator iron core 11, with respect to the stator winding 12, twenty-four cooling tubes $13_{a1} \sim 13_{a6}$, $13_{b1} \sim 13_{b6}$, $13_{c1} \sim 13_{c6}$ and $13_{d1} \sim 13_{d6}$, which pass through the stator iron core 11 in the axial direction thereof and are arranged along the circumference thereof, are provided, the details of which will be explained later with reference to FIG. 2. By causing a common coolant to flow through these cooling tubes 13 which is a general reference numeral for the cooling tubes, the heat generated from the stator winding 12 is absorbed thereby.

Figure 2:
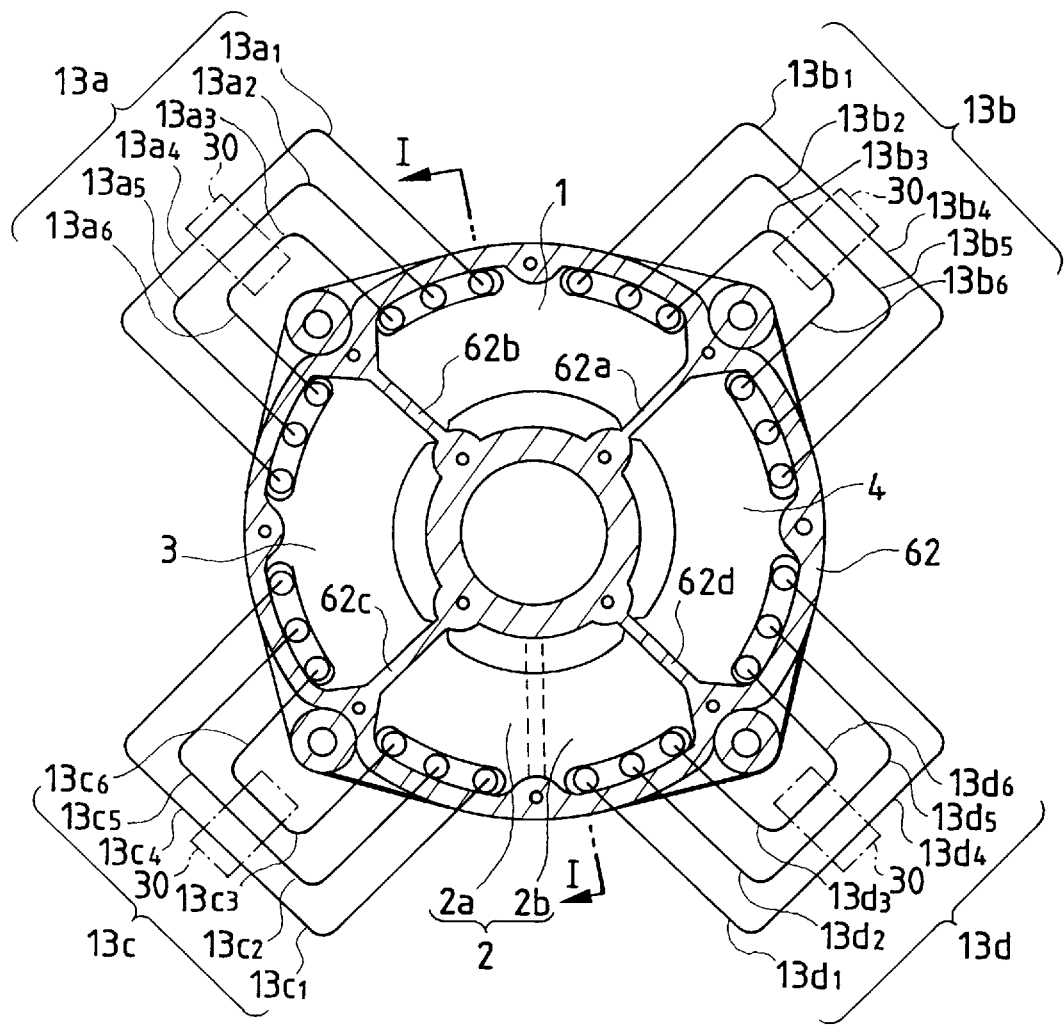
FIG. 2 is a cross sectional view taken along the line II—II in FIG. 1.

Among the two end brackets 62 and 63 in the end bracket 62 located at the left side in FIG. 1, coolant reservoirs 1, 2, 3 and 4 are provided into which the many cooling tubes 13 disposed in the stator iron core 11 are introduced. FIG. 2 is a cross sectional view taken along the line II—II in FIG. 1 and shows the arrangement of these coolant reservoirs 1, 2, 3 and 4. Further, in FIG.2 the connecting relation between respective coolant reservoirs 1, 2, 3 and 4 via the cooling tubes 13 is also diagrammatically illustrated.

As seen from FIG. 2, the coolant reservoirs 1, 2, 3 and 4 are separated by a plurality of radially extending partition walls 62a, 62b, 62c and 62d and are arranged circumferentially around the rotor axis. Further, the respective coolant reservoirs 1, 2, 3 and 4 are structured so as to introduce coolant near the outer circumferential portion of the bearing 52 to cool the same, as seen from FIG. 1. Thereby, the coolant reservoirs 1, 2, 3 and 4 can serve to absorb heat generated from the coil end portions of the stator windings 12, as well as to suppress any temperature rise at the bearing 52.

Further, as seen from FIG. 2, which shows the left side ends in FIG. 1, respective ends of the twenty-four cooling tubes $13_{a1} \sim a6$, $13_{b1} \sim b6$, $13_{c1} \sim c6$ and $13_{d1} \sim d6$ communicate with respective corresponding coolant reservoirs 1, 2, 3 and 4. Namely, the cooling tubes $13_{a1} \sim a3$ and $13_{b1} \sim b3$ communicate with the coolant reservoir 1, the cooling tubes $13_{c1} \sim c3$ and $13_{d1} \sim d3$ communicate with the coolant reservoir 2, the cooling tubes $13_{a4} \sim a6$ and $13_{c4} \sim c6$ communicate with the coolant reservoir 3 and the cooling tubes $13_{b4} \sim b6$ and $13_{d4} \sim_{d6}$ communicate with the coolant reservoir 4. Further, as shown by dotted lines in FIG. 2, the coolant reservoir 2 is structured to make it possible to use the chamber as two divided chambers to form a first subchamber 2a and a second subchamber 2b, so that the cooling tubes $13_{c1}$, $13_{c2}$, and $13_{c3}$ communicate with the first subchamber 2a and the cooling tubes $13_{d1}$, $13_{d2}$ and $13_{d3}$ communicate with the second subchamber 2b.

On the other hand, at the right side in FIG. 1, the respective cooling tubes 13 are connected by U shaped connecting tubes 30 at the outside in the axial direction of the stator iron core 11. Namely, the cooling tubes $13_{a1}$, $13_{a2}$ and $13_{a3}$ are respectively connected to the cooling tubes $13_{a4}$, $13_{a5}$ and $13_{a6}$ via the corresponding U shaped connecting tubes 30; the cooling tubes $13_{b1}$, $13_{b2}$ and $13_{b3}$ are respectively connected to the cooling tubes $13_{b4}$, $13_{b5}$ and $13_{b6}$ via the corresponding U shaped connecting tubes 30; the cooling tubes $13_{c1}$, $13_{c2}$ and $13_{c3}$ are respectively connected to the cooling tubes $13_{c4}$, $13_{c5}$ and $13_{c6}$ via the corresponding U shaped connecting tubes 30; and the cooling tubes $13_{d1}$, $13_{d2}$ and $13_{d3}$ are respectively connected to the cooling tubes $13_{d4}$, $13_{d5}$ and $13_{d6}$ via the corresponding U shaped connecting tubes 30. Alternatively, two cooling tubes 13 to be connected and the corresponding U shaped connecting tube 30 can be integrally constructed into a single U shaped cooling tube beforehand.

Figure 3:
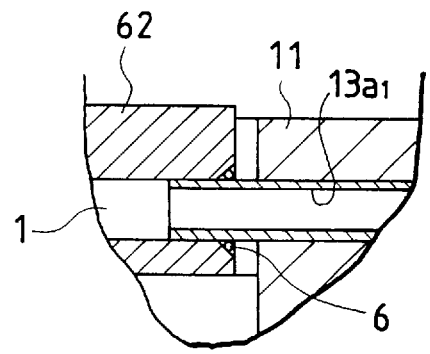
FIG. 3 is an enlarged cross sectional view of the portion A in FIG. 1.

FIG. 3 is an enlarged cross sectional view of the encircled portion A in FIG. 1 and shows a connecting structure between the cooling tube 13 and the coolant reservoir 1.

In FIG. 3, the cooling tube $13_{a1}$, projecting from the end face of the stator iron core 11 is fitted into an aperture formed in the coolant reservoir 1 within the end bracket 62. Further, the sealing between the end bracket 62 and the cooling tube $13_{a1}$ is provided by an O ring 6. Further, although not specifically shown in the drawing, the same structure as explained above is used between the other cooling tubes and the corresponding coolant reservoirs.

Figure 4:
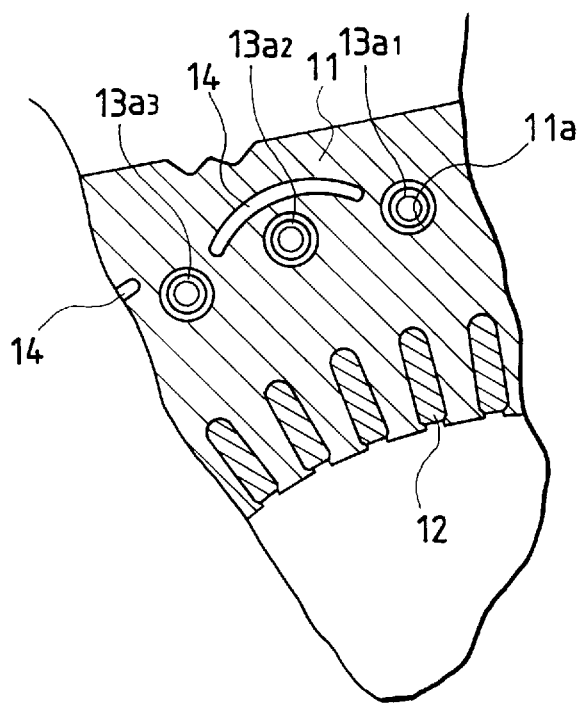
FIG. 4 is a partial cross sectional view taken along the line IV—IV in FIG. 1.

FIG. 4 is a partial cross sectional view taken along the line IV–IV in FIG. 1 and shows an arrangement of the cooling tubes 13 within the stator iron core 11. The cooling tubes $13_{a1}$, $13_{a2}$ and $13_{a3}$ in FIG. 4 are insulated copper tubes formed by bake finishing with fluororesin and are secured in respective through-holes 11a formed in the stator iron core 11 by tube expanding pressure welding. In this instance, the tube expanding pressure welding for the cooling tubes is performed, for example, by a method in which the cooling tubes are plastically deformed by expanding them, such as with a reamer, and by a method in which the cooling tubes are plastically deformed by forcing liquid at a high pressure into the cooling tubes. Further, although the cooling tubes $13_{a1}$, $13_{a2}$ and $13_{a3}$ are insulation coated tubes, an arcuate clearance portion 14 in a form of a cavity is provided at an outer circumferential portion with respect to the cooling tubes 13 and somewhat remote therefrom where a magnetic circuit due to currents flowing through the stator windings 12 is possibly formed.

With the thus described coolant passage structure formed by the cooling tubes $13_{a1}$, $13_{a2}$ and $13_{a3}$, the sealing of the coolant in the stator iron core 11 is realized with a simple structure and the cooling tubes $13_{a1}$, $13_{a2}$ and $13_{a3}$ are tightly secured to the stator iron core 11, so that the thermal conductivity between the stator iron core 11 and the coolant is enhanced. Further, the cooling tubes $13_{a1}$, $13_{a2}$ and $13_{a3}$ are electrically insulated from the stator iron core 11, so that generation of electromotive forces in the cooling tubes $13_{a1}$, $13_{a2}$ and $13_{a3}$ due to magnetic fluxes induced by currents flowing through the stator windings 12 is prevented, and thereby deterioration of the output characteristic and efficiency of the dynamoelectric machine 100 due to induction currents caused by possible electromotive forces is also prevented. Still further, with the provision of the clearance portions 14 at the outer circumferential portion in the stator iron core 11 with respect to the cooling tubes $13_{a1}$, $13_{a2}$ and $13_{a3}$, among the fluxes induced by the currents flowing through the stator windings 12, the flux component which interlinks with the cooling tubes $13_{a1}$, $13_{a2}$ and $13_{a3}$ can be reduced, so that the electromotive forces induced in the cooling tubes $13_{a1}$, $13_{a2}$ and $13_{a3}$ are further reliably prevented.

Although not specifically shown in the drawing, the other cooling tubes 13 in the stationary iron core 11, other than the cooling tubes $13_{a1}$, $13_{a2}$ and $13_{a3}$, are structured and arranged in the same manner as the cooling tubes $13_{a1}$, $13_{a2}$ and $13_{a3}$ and achieve the same function and advantages as those of the cooling tubes $13_{a1}$, $13_{a2}$ and $13_{a3}$.

Figure 5:
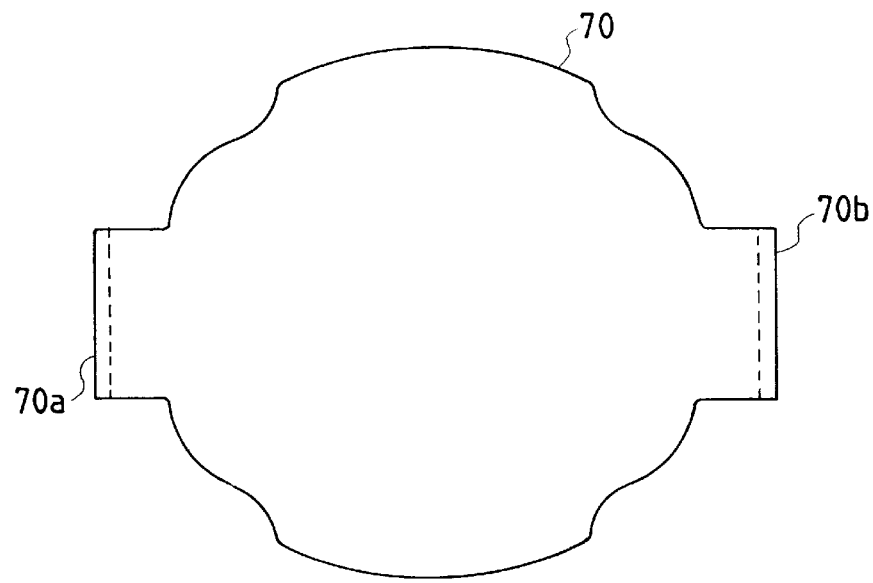
FIG. 5 is a plane view of an open and close valve portion 70 when viewed from the direction B in FIG. 1.

Now, returning to FIG. 1, at the left side of the dynamoelectric machine as seen in FIG. 1, an open and close valve portion 70 is provided which changes over the connecting relation between series and parallel connections, between the respective coolant reservoirs 1, 2, 3 and 4 via the respective cooling tubes 13. FIG. 5 shows a plane view of the open and close valve portion 70 viewed from the arrow B direction in FIG. 1.

Figure 6:
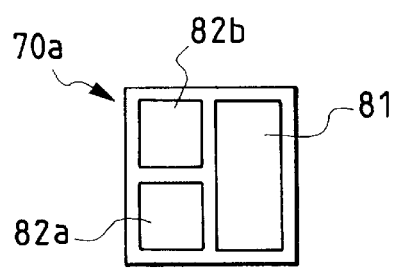
FIG. 6 is a view of the opening portion of the valve inlet 70a shown in FIG. 5 when viewed from the front portion thereof.
Figure 7:
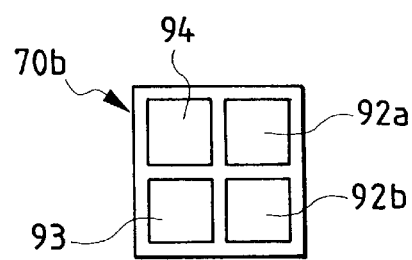
FIG. 7 is a view of the opening portion of the valve outlet 70b shown in FIG. 5 when viewed from the front portion thereof.

As seen in FIG. 5, the open and close valve portion 70 includes a valve inlet 70a, which is connected to a coolant source, such as a pump P, and a valve outlet 70b, which is connected to an exhaust coolant receiving arrangement, such as a tank. FIGS. 6 and 7 respectively show front views of the opening portions of the valve inlet 70a and the valve outlet 70b. As illustrated in FIGS. 6 and 7, the valve inlet 70a is structured so as to provide open end portions of respective internal conduits 81, 82a and 82b, and the valve outlet 70b is also structured so as to provide open end portions of respective internal conduits 92a, 92b, 93 and 94, the details of which will be explained later.

Figure 8:
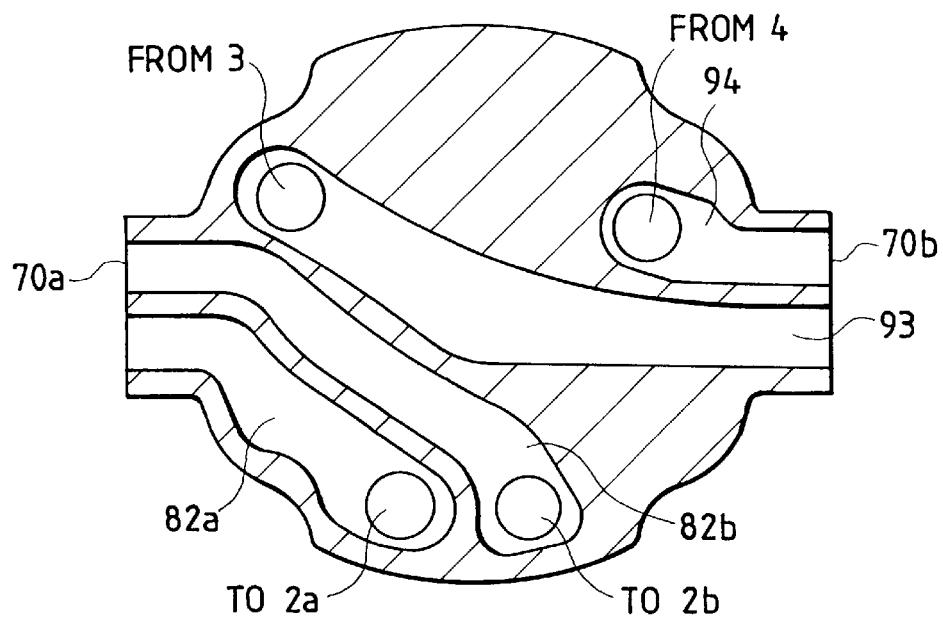
FIG. 8 is a cross sectional view taken along the line VIII—VIII in FIG. 1.
Figure 9:
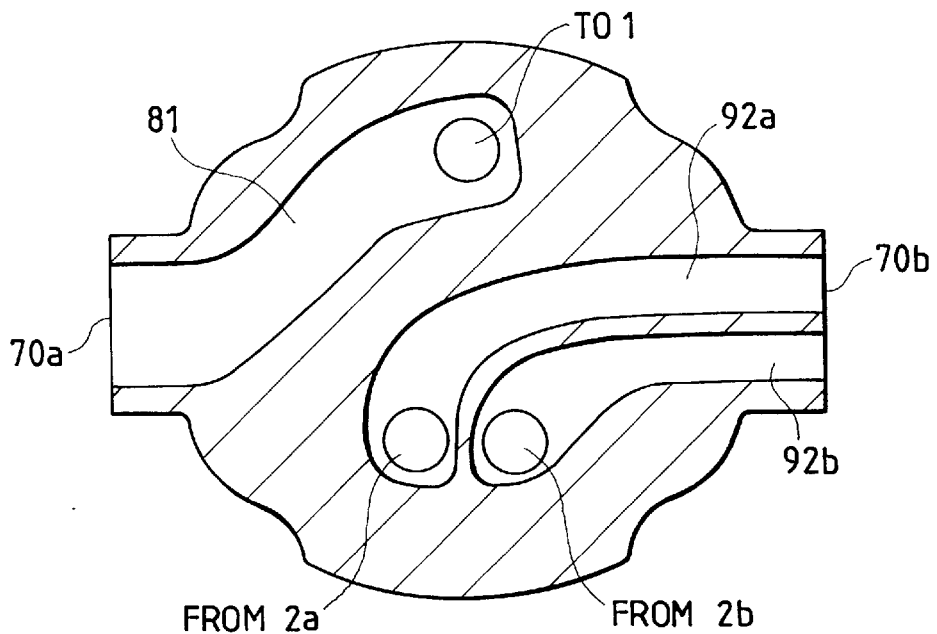
FIG. 9 is a cross sectional view taken along the line IX—IX in FIG. 1.

FIG. 8 is a cross sectional view taken along the line VIII—VIII in FIG. 1, and FIG. 9 is a cross sectional view taken along the line IX—IX in FIG. 1, and both show internal structures of the open and close valve portion 70.

As shown in FIGS. 8 and 9, the valve chamber is structured in double stages and the internal conduits 81, 82a, 82b, 92a, 92b, 93 and 94 are formed therein so as to connect the valve inlet 70a and the valve outlet 70b via the corresponding coolant reservoirs 1, 2, 3 and 4. Namely, in the valve chamber at the first stage, as shown in FIG. 8, the internal conduits 82a and 82b respectively connect the coolant reservoirs 2a and 2b and the valve inlet 70a, the internal conduit 93 connects the coolant reservoir 3 and the valve outlet 70b, and the internal conduit 94 connects the coolant reservoir 4 and the valve outlet 70b. Further, in the valve chamber at the second stage as shown in FIG. 9, the internal conduit 81 connects the coolant reservoir 1 and the valve inlet 70a and the internal conduits 92a and 92b respectively connect the coolant reservoirs 2a and 2b and the valve outlet 70b.

These internal conduits 81, 82a, 82b, 92a, 92b, 93 and 94 are designed closable at the opening portions of the valve inlet 70a and the valve outlet 70b, as shown in FIGS. 6 and 7, by inserting respective plate members (not shown). Namely, the opening portions of the respective internal conduits at the valve inlet 70a and the valve outlet 70b are provided with respective opening faces, which are illustrated by dotted lines in FIG. 5, and are slightly recessed from the valve body casing so as to permit 2 insertion of the plate members, and the plate members have sizes which are designed to meet the sizes of these opening faces when properly inserted and removed depending on the valve configuration requirements. Thereby, at the valve inlet 70a, the respective internal conduits 81, 82a and 82b can be separately and independently made to open to or closed to the coolant supply source, and at the valve outlet 70b, the respective internal conduits 92a, 92b, 93 and 94 can be separately and independently made to open to or close to the exhaust coolant receiving arrangement. As a result, the open and close valve portion 70 constitutes a plurality of valves which control the opening and closing of the internal conduits connecting the coolant source and the exhaust coolant receiving arrangement and the coolant reservoirs.

The coolant flow route in the above explained structure and the performance thereby are hereinbelow explained.

As indicated above, through the operation of the open and close valve 70, the connecting relation, whether in series and in parallel, of the coolant reservoirs 1, 2, 3 and 4 via the respective cooling tubes 13 is changed over to vary the combinations of the coolant flow passages, which combinations can be classified into three cases, as illustrated in FIG. 10. Hereinbelow, the respective three cases will be individually explained.

(1) In a first case, in which, at the valve inlet 70a, the internal conduit 81 is open and the internal conduits 82a and 82b are closed, and at the valve outlet 70b, the internal conduits 92a and 92b are open and the internal conduits 93 and 94 are closed, the subchambers 2a and 2b are not functionally separated.

In this first case, the coolant from the coolant supply source flows into the coolant reservoir 1 via the valve inlet 70a→the internal conduit 81 and is branched so that coolant flows into the respective cooling tubes $13_{a1}$, $13_{a2}$, $13_{a3}$, $13_{b1}$, $13_{b2}$ and $13_{b3}$ communicating with the coolant reservoir 1.

(i) At first, the coolant flows through the cooling tubes $13_{a1}$, $13_{a2}$ and $13_{a3}$→ the cooling tubes $13_{a4}$, $13_{a5}$ and $13_{a6}$ (hereinbelow these cooling tubes are generally called as cooling tubes 13a while deleting the numeral suffixes in the explanation in connection with FIG. 10) and into the coolant reservoir 3 from these three cooling tubes $13_{a4}$, $13_{a5}$ and $13_{a6}$. In this case, since the internal conduit 93 is closed at the valve outlet 70b, the coolant in the coolant reservoir 3 again branches and flows into the three cooling tubes $13_{c4}$, $13_{c5}$ and $13_{c6}$ and then flows into the first subchamber 2a in the coolant reservoir 2 via the cooling tubes $13_{c1}$, $13_{c2}$ and $13_{c3}$.

(ii) On the other hand, the coolant which flows through the cooling tubes $13_{b1}$, $13_{b2}$ and $13_{b3}$→the cooling tubes $13_{b4}$, $13_{b5}$ and $13_{b6}$ flows into the coolant reservoir 4 from these three cooling tubes $13_{b4}$, $13_{b5}$ and $13_{b6}$. In this case, since the internal conduit 94 is also closed at the valve outlet 70b, the coolant in the coolant reservoir 4 again branches and flows into the three cooling tubes $13_{d4}$, $13_{d5}$ and $13_{d6}$ and then flows into the second subchamber 2b in the coolant reservoir 2 via the cooling tubes $13_{d1}$, $13_{d2}$ and $13_{d3}$.

In the present case, since the first and second subchambers 2a and 2b in the coolant reservoir 2 are not functionally separated, the coolant in the first and second subchambers 2a and 2b merges. In this case, the internal conduits 82a and 82b which are designed to connect the first and second subchambers 2a and 2b to the inlet side are closed at the valve inlet 70a, and so the coolant in the first and second subchambers 2a and 2b in the coolant reservoir 2 branches and flows into the internal conduits 92a and 92b and thereafter is exhausted via the valve outlet 70b into the exhaust coolant receiving arrangement.

In the present coolant flow passage combination, the coolant branches along six routes which flow substantially in parallel to each other.

(2) In a second case, in which at the valve inlet 70a, the internal conduits 81, 82a and 82b are open, and at the valve outlet 70b, the internal conduits 92a and 92b are closed and the internal conduits 93 and 94 are open, the first and second subchambers 2a and 2b in the coolant reservoir 2 are separated.

In this second case, since all of the internal conduits 82a and 82b are open at the valve inlet 70a, the coolant from the coolant supply source branches at the valve inlet 70a and flows into three internal conduits 81, 82a and 82b, and then the coolant flows respectively into the coolant reservoir 1, the first subchamber 2a in the coolant reservoir 2 and the second subchamber 2b in the coolant reservoir 2.

(i) The coolant which flows into the coolant reservoir 1 from the internal conduit 81 branches and flows into respective cooling tubes $13_{a1}$, $13_{a2}$, $13_{a3}$, $13_{b1}$, $13_{b2}$ and $13_{b3}$ communicating with the coolant reservoir 1. The coolant flows through the cooling tubes $13_{a1}$, $13_{a2}$ and $13_{a3}$→the cooling tubes $13_{a4}$, $13_{a5}$ and $13_{a6}$ and into the coolant reservoir 3 from these three cooling tubes $13_{a4}$, $13_{a5}$ and $13_{a6}$ and merges with coolant flowing in from the first subchamber 2a, as will be explained later. Then, the coolant in the coolant reservoir 3 flows to the valve outlet 70b via the internal conduit 93 and merges at the valve outlet 70b with the coolant flowing from the coolant reservoir 4, as will be explained later, and thereafter is exhausted into the exhaust coolant receiving arrangement.

On the other hand, the coolant which flows through the cooling tubes $13_{b1}$, $13_{b2}$ and $13_{b3}$→the cooling tubes $13_{b4}$, $13_{b5}$ and $13_{b6}$, among the coolant which flows into the coolant reservoir 1, flows into the coolant reservoir 4 from these three cooling tubes $13_{b4}$, $13_{b5}$ and $13_{b6}$ and joins with coolant flowing in from the second subchamber 2b, as will be explained later. Then, the coolant in the coolant reservoir 4 flows to the valve outlet 70b via the internal conduit 94 and merges at the valve outlet 70b with the coolant flowing from the coolant reservoir 3, as mentioned above, and thereafter is exhausted into the coolant exhaust receiving arrangement.

(ii) Since the internal conduit 92a is closed, the coolant which flows into the first subchamber 2a in the coolant reservoir 2 from the internal conduit 82a branches and flows into the respective cooling tubes $13_{c1}$, $13_{c2}$ and $13_{c3}$ communicating with the first subchamber 2a in the coolant reservoir 2. Then, the coolant flows through the cooling tubes $13_{c1}$, $13_{c2}$ and $13_{c3}$→the cooling tubes $13_{c4}$, $13_{c5}$ and $13_{c6}$ and flows into the coolant reservoir 3 and there merges with the coolant flowing from the reservoir 1, as mentioned above, and is then introduced through the internal conduit 93→the valve outlet 70b.

(iii) Since the internal conduit 92b is closed at the valve outlet 70b, the coolant which flows into the second subchamber 2b in the coolant reservoir 2 from the internal conduit 82b branches and flows into the respective cooling tubes $13_{d1}$, $13_{d2}$ and $13_{d3}$ communicating with the second subchamber 2b in the coolant reservoir 2. Then, the coolant flows through the cooling tubes $13_{d1}$, $13_{d2}$ and $13_{d3}$→the cooling tubes $13_{d4}$, $13_{d5}$ and $13_{d6}$ and flows into the coolant reservoir 4 and there merges with the coolant flowing from the coolant reservoir 1, as mentioned above, and is then introduced through the internal conduit 94→the valve outlet 70b.

In the present combination, the coolant branches through twelve routes which flow substantially in parallel to each other.

(3) In a third case, in which, at the valve inlet 70$a$, the internal conduit 82$a$ is open and the internal conduits 81 and 82$b$ are closed, and at the valve outlet 70$b$, the internal conduit 92$b$ is open and the internal conduits 92$a$, 93 and 94 are closed, the first and second subchambers 2$a$ and 2$b$ in the coolant reservoir 2 are separated.

In this third case, since the internal conduit 92$a$ is closed at the valve outlet 70$b$, the coolant flows from the coolant supply source into the first subchamber 2$a$ in the coolant reservoir 2 via the valve inlet 70$a$→internal conduit 82$a$ and flows into the respective cooling tubes 13$_{c1}$, 13$_{c2}$ and 13$_{c3}$ connected to the first subchamber 2$a$. Then, the coolant which flows through the cooling tubes 13$_{c1}$, 13$_{c2}$ and 13$_{c3}$→the cooling tubes 13$_{c4}$, 13$_{c5}$ and 13$_{c6}$ flows into the coolant reservoir 3 from these three cooling tubes 13$_{c4}$, 13$_{c5}$ and 13$_{c6}$.

In this case, since the internal conduit 93 is closed at the valve outlet 70$b$, the coolant in the coolant reservoir 3 again branches and flows into the three cooling tubes 13$_{a4}$, 13$_{a5}$ and 13$_{a6}$ and then flows into the coolant reservoir 1 via the cooling tubes 13$_{a1}$, 13$_{a2}$ and 13$_{a3}$. Further, since the internal conduit 81 is closed at the valve inlet 70$a$, the coolant in the coolant reservoir 1 again branches and flows into the three cooling tubes 13$_{b1}$, 13$_{b2}$ and 13$_{b3}$ and flows into the coolant reservoir 4 via the cooling tubes 13$_{b4}$, 13$_{b5}$ and 13$_{b6}$.

Still further, in this case, since the internal conduit 94 is closed at the valve outlet 70$b$, the coolant in the coolant reservoir 4 again branches and flows into the three cooling tubes 13$_{d4}$, 13$_{d5}$ and 13$_{d6}$ and then flows into the second subchamber 2$b$ in the coolant reservoir 2 via the cooling tubes 13$_{d1}$, 13$_{d2}$ and 13$_{d3}$.

Now, since the internal conduit 82$b$ which connects the second subchamber 2$b$ to the inlet side is closed at the valve inlet 70$a$, the coolant in the second subchamber 2$b$ flows into the internal conduit 92$b$ and is exhausted from the valve outlet 70$b$ to the exhaust coolant receiving arrangement.

In the present combination, the coolant branches in three routes which flow substantially in parallel to each other.

As will be understood from the above, by changing over the valves in the open and close valve portion 70, the combinations of coolant flow passages constituted by the coolant reservoirs 1, 2, 3 and 4 and the cooling tubes 13 can be varied. For example, when a high coolant temperature is required, the third case (3) which is a combination having relatively few parallel coolant flow routes can be selected, and when a high coolant temperature is not required, the second case (2) which is a combination having many parallel coolant flow routes can be selected, so that the cooling capacity of the arrangement can be easily adjusted depending on the circumstances and the heat generated from the stator windings 12 can be efficiently recovered while preventing a performance reduction of the dynamoelectric machine 100. Accordingly, for example, the coolant outlet temperature can be kept constant regardless of the magnitude of the heat generated from the dynamoelectric machine, which is effective for an electric vehicle in which the waste heat from the electric motor is recovered and used as a heat source, for example, for an air conditioner.

Further, in all cases (1) through (3) above, the coolant branches in a plurality of routes (6 routes, 12 routes and 3 routes) over at least some portion of the flow passages and flows in parallel. Accordingly, the pressure loss of the coolant is reduced in comparison with the conventional cooling arrangement wherein the coolant flows as a single flow through a long coolant passage formed by connecting all of a plurality of cooling tubes in series. Further, in the present embodiment, because of the reduction of the pressure loss, the cross sectional area of each through hole 11$a$, in which the cooling tubes 13 are positioned, can be reduced, so that the outer diameter of the stator iron core 11, as well as that of the rotor 41, can be reduced.

Still further, in this first embodiment, the coolant reservoirs are provided only at one of the end brackets 62 and 63, that is, in the end bracket 62, so that the arrangement and the coolant sealing structure of the cooling tubes 13 are simplified in comparison with the following second embodiment, in which the coolant reservoirs are provided at both end brackets, as will be explained in detail later.

In the first embodiment, four coolant reservoirs are provided and are connected to each other using twenty-four cooling tubes 13. However, the present invention is not limited to such a specific embodiment. For example, if one coolant reservoir whose upstream side is connected to a coolant supply source and another coolant reservoir whose downstream side is connected to an exhaust coolant receiving arrangement are provided and these two reservoirs are connected by a plurality of cooling tubes arranged in parallel, the reduction of the pressure loss is also effected. Alternatively, if the number of the coolant reservoirs, as well as the number of cooling tubes, are increased and corresponding internal conduits are provided in the open and close valve portion 70, many combinations of coolant flow passages can be provided, so that the cooling capacity of the cooling arrangement can be even more finely adjusted.

Further, in the first embodiment, copper tubes coated with an insulating material are used as the cooling tubes 13, however, instead of using an insulation coating on the cooling tubes, substantially the same advantages can be constituted by forming the tubes of a material having an electrical resistivity of more than 10 $\mu\Omega\cdot$cm, such as stainless steel. When an aluminum tube is used for the cooling tube, it is necessary to apply an insulation coating on the aluminum tube in the same manner as in the first embodiment, because the electrical resistivity of aluminum is less than 10 $\mu\Omega\cdot$cm. From the point of view of the heat resistance and insulation properties, it is preferable to use a bake coating of fluororesin for the insulation coating. Further, from the point of view of the heat resistance and work efficiency, it is preferable to use heat shrinkable tubes of siliconresin or fluororesin to attain the necessary insulation properties. With these modifications, substantially the same advantages as those afforded by the present embodiment can be obtained.

Still further, in the first embodiment, the clearances 14 in the form of a cavity are provided at the outer circumference side in the stator iron core 11 with respect to the cooling tubes 13. However, the present invention is not limited to such a specific embodiment. For example, at the equivalent positions in the stator iron core, non-metallic layers, for example resin layers, can be disposed so as to prevent the passage of magnetic fluxes, and with such a modification, substantially the same advantages as obtained with the clearances 14 in the form of a cavity can be obtained.

Still further, in the first embodiment, a cooling structure is used in which the coolant flows through the stator iron core 11 to cool the core from the inside thereof, however, the present invention is not limited to such a specific embodiment. For example, the present invention can be applied to a cooling structure in which the coolant is designed to flow through frames disposed around the outer circumference of the stator iron core to thereby cool the stator iron core from the outside thereof via the frames. In this modification, substantially the same advantages with regard to the reduction of pressure loss and adjustability of cooling capacity as obtained in the first embodiment can be obtained.

Figure 11:
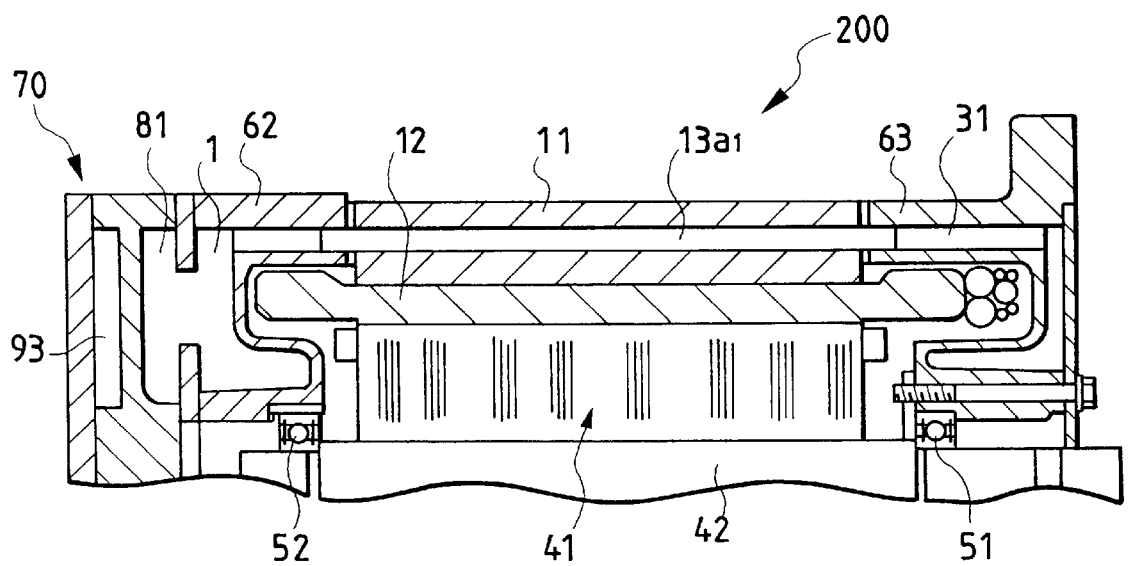
FIG. 11 is a longitudinal cross sectional view showing a partial structure of a dynamoelectric machine representing a second embodiment according to the present invention.

A second embodiment of the present invention will be explained with reference to FIG. 11. In the present embodiment the coolant reservoirs are provided in both end brackets as mentioned above. In FIG. 11 embodiment the same or equivalent elements as in FIG. 1 embodiment are designated by the same reference numerals.

FIG. 11 is a cross sectional view showing a structure of a part of a dynamoelectric machine 200 according to the present embodiment.

The differences between the dynamoelectric machine 200 and the dynamoelectric machine 100 according to the first embodiment are that coolant reservoirs 31 through 34 (only the reservoir 31 is illustrated) are provided in the end bracket 63 located at the opposite side with respect to the end bracket 62 in which the coolant reservoirs 1 through 4 are already provided. Namely, the coolant reservoirs 31 through 34, although not specifically illustrated, are structured similar to the coolant reservoirs 1 through 4 except that no connection structures to the internal conduits 81, 82a, 82b, 92a, 92b, 93 and 94 in the open and close valve portion 70 are formed. For example, the coolant reservoir 31 is constituted to communicate with the cooling tubes $13_{a1}$, $13_{a2}$, $13_{a3}$, $13_{a4}$, $13_{a5}$ and $13_{a6}$, the coolant reservoir 32 is constituted to communicate with the cooling tubes $13_{d1}$, $13_{d2}$, $13_{d3}$, $13_{d4}$ and $13_{d6}$ the coolant reservoir 33 is constituted to communicate with the cooling tubes $13_{c1}$, $13_{c2}$, $13_{c3}$, $13_{c4}$, $13_{c5}$ and $13_{c6}$ and the coolant reservoir 34 is constituted to communicate with the cooling tubes $13_{b1}$, $13_{b2}$, $13_{b3}$, $13_{b4}$, $13_{b5}$ and $13_{b6}$ so as to perform the function of the U shaped connecting tubes in the first embodiment.

Other elements of the FIG. 11 embodiment are substantially the same as those in the first embodiment.

With the present embodiment substantially the same advantages as obtained in the first embodiment.

Moreover, in place of the U shaped connecting tube 30 in the coolant flow passage, for example, the cooling $13_{a1} \rightarrow$ U shaped connecting tube 30→the cooling tube $13_{a4}$ in the first embodiment, the coolant reservoir 31 is provided in the present embodiment. Accordingly, the portions having narrow coolant passage are shortened, so that the pressure loss therein is further reduced.

In the second embodiment, no open and close valve portion 70 as disposed at the side of the end bracket 62 is provided at the side of the end bracket 63. However, the present invention is not limited to such a specific embodiment. For example, a similar open and close valve portion can be provided at the side of the end bracket 63. In such a case, when opening and closing of the internal conduits in the thus provided open and close valve portion are properly controlled, many additional variations of the coolant flow passages can be formed, so that the cooling capacity of the cooling arrangement can be even more finely adjusted.

Figure 12:
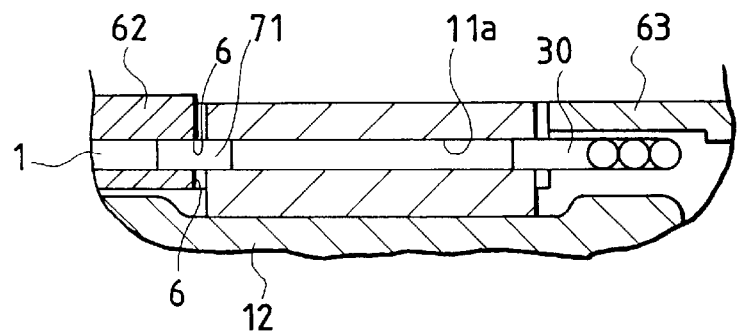
FIG. 12 is a cross sectional view showing a connecting structure between a coolant reservoir and a coolant passage of a dynamoelectric machine representing a third embodiment according to the present invention.

A third embodiment of the present invention will be explained with reference to FIG. 12. In the present embodiment, the coolant flow passages are constituted without using cooling tubes. In FIG. 12 the same and equivalent elements as in the first and second embodiments are designated by the same reference numerals.

FIG. 12 is a vertical cross sectional view showing a structure for effecting connection between a coolant reservoir and a coolant flow passage in a major portion of a dynamoelectric machine according to the third embodiment. Further, FIG. 12 shows in particular the portion corresponding to the encircled portion C in FIG. 1 as a vertical cross section among the elements of the dynamoelectric machine according to the present embodiment.

The differences between the FIG. 12 embodiment and the dynamoelectric machine 100 according to the first embodiment are that the coolant flow passage is constituted without using the cooling tubes 13 by applying coolant leakage preventing means, for example, a water proof coating for maintaining a coolant sealing property, over the inner circumference of the through holes 11a formed through the stator iron core 11 extending in substantially the axial direction thereof. Further, at the connecting portion with the end bracket 62, connecting tubes 71 having a short length are respectively fitted into apertures formed at the coolant reservoirs 1 through 4 in the end bracket 62 and into the corresponding through holes 11a, and the sealing between the end bracket 62 and the connecting tubes 71 is maintained by O rings 6. Further, at the side of the end bracket 63, the U shaped connecting tubes 30 are respectively fitted into the corresponding through holes 11a formed in the stator iron core.

Other elements of the present embodiment are substantially the same as those of the dynamoelectric machine 100 according to the first embodiment.

According to the present embodiment, no electrical circuits are formed between the stator iron core 11 and the cooling tubes, as in the case when the cooling tubes are used, so that the generation of electromotive forces is prevented.

According to the present invention, when the coolant flows through a plurality of the coolant passages, the coolant flows at least partly in a parallel flow branching at least in two parallel lines. Therefore, the pressure loss in the coolant passages can be reduced in comparison with a conventional cooling system where coolant flows as a single flow through a long coolant passage formed by connecting all of a plurality of cooling tubes in series.

Further, according to the present invention, by changing-over the order and manner of the connection of the coolant passages depending on the conditions using change-over connection means, the coolant distributing directions and the number of parallel circuits of the coolant passages are varied, so that the cooling capacity of the cooling arrangement can be easily adjusted.

Accordingly, with the cooling arrangement of the present invention, a variety of requirements relevant to coolant waste heat reusing, such as maintaining the outlet temperature substantially constant regardless of the magnitude of the generated heat at the dynamoelectric machine, can be satisfied.

Still further, according to the present invention, with the provision of insulating means for the cooling tubes, which isolates the same from the stator iron core, electromotive forces induced in the cooling tubes by the magnetic fluxes caused by the currents flowing through the stator windings are prevented.

We claim:

1. A dynamoelectric machine comprising: a rotor supported rotatably; a stator disposed around the outer circumference of said rotor and including stationary windings which operate to generate rotating magnetic fields and a stationary iron core, a plurality of coolant passages being formed in the axial direction of said stationary iron core; and a plurality of coolant branching means, each of said plurality of coolant branching means being located at an axial end of said rotor and said stator and connected to one end of at least two of said plurality of coolant passages, said plurality of coolant branching means including a supply coolant branching means having an upstream portion with respect to coolant flow which is connected to a coolant supply source and an exhaust coolant branching means having an downstream portion with respect to coolant flow which is connected to an exhaust coolant receiving arrangement, said plurality of coolant passages being constituted by at least two upstream side coolant passages with respect to coolant flow connected to each other in parallel to said supply coolant branching means, at least two downstream side coolant passages with respect to coolant flow connected to each other in parallel to said exhaust coolant branching means and intermediate coolant passages connecting said at least two upstream side coolant passages with respect to coolant flow and said at least two downstream side coolant passages with respect to coolant flow.

2. A dynamoelectric machine according to claim 1, characterized in that said upstream side coolant passages, said downstream side coolant passages and said intermediate coolant passages are respectively provided so as to pass through said stationary iron core in substationally the axial direction thereof.

3. A dynamoelectric machine according to claim 1, characterized in that said plurality of coolant branching means further includes supply and exhaust coolant branching means having an upstream side with respect to coolant flow which is connected to said coolant supply source and a downstream side with respect to coolant flow which is connected to said exhaust coolant receiving arrangement, and all of said coolant branching means, including said supply and exhaust coolant branching means, are constituted to be freely connectable to each other at the upstream side and the downstream side thereof and are constituted to permit selective change-over between parallel and series connections via change-over connection means.

4. A dynamoelectric machine according to claim 1, further comprising two end brackets which rotatably support the respective ends of a rotatable shaft provided for said rotor via bearings, and wherein said supply coolant branching means is a supply coolant reservoir formed within one of said two end brackets.

5. A dynamoelectric machine according to claim 3, further comprising two end brackets which rotatably support the respective ends of a rotatable shaft provided for said rotor via bearings, and wherein said supply coolant branching means is a supply coolant reservoir formed within one of said two end brackets.

6. A dynamoelectric machine according to claim 1, further comprising two end brackets which rotatably support the respective ends of a rotatable shaft provided for said rotor via bearings, and wherein said exhaust coolant branching means is an exhaust coolant reservoir formed within one of said two end brackets.

7. A dynamoelectric machine according to claim 3, further comprising two end brackets which rotatably support the respective ends of a rotatable shaft provided for said rotor via bearings, and wherein said exhaust coolant branching means is an exhaust coolant reservoir formed within one of said two end brackets.

8. A dynamoelectric machine according to claim 3, further comprising two end brackets which rotatably support the respective ends of a rotatable shaft provided for said rotor via bearings, and wherein said supply and exhaust coolant branching means is a supply and exhaust coolant reservoir formed within one of said two end brackets.

9. A dynamoelectric machine according to claim 3, characterized in that said change-over connection means includes a first open and close valve which controls opening and closing of a conduit connecting the upstream side of said supply coolant branching means and said coolant supply source, a second open and close valve which controls opening and closing of a conduit connecting the upstream side of said supply and exhaust coolant branching means and said coolant supply source, a third open and close valve which controls opening and closing of a conduit connecting the downstream side of said supply and exhaust coolant branching means and said exhaust coolant receiving arrangement, and a fourth open and close valve which controls opening and closing of a conduit connecting the downstream side of said exhaust coolant branching means and said exhaust coolant receiving arrangement.

10. A dynamoelectric machine according to claim 1, characterized in that said coolant passages are disposed within said stator iron core at an outer circumferential side with respect to said stator windings.

11. A dynamoelectric machine according to claim 1, characterized in that said coolant passages are disposed around the outer circumference of said stator iron core.

\* \* \* \* \*